May 15, 1956

R. A. McCALLUM 2,745,506

LEVER CONTROL MECHANISM FOR COMBINED OPERATION
OF VEHICLE TRAMMING AND STEERING VALVES

Filed Oct. 21, 1952

INVENTOR.
Robert A. McCallum
BY
Murray A. Gleeson
Attorney

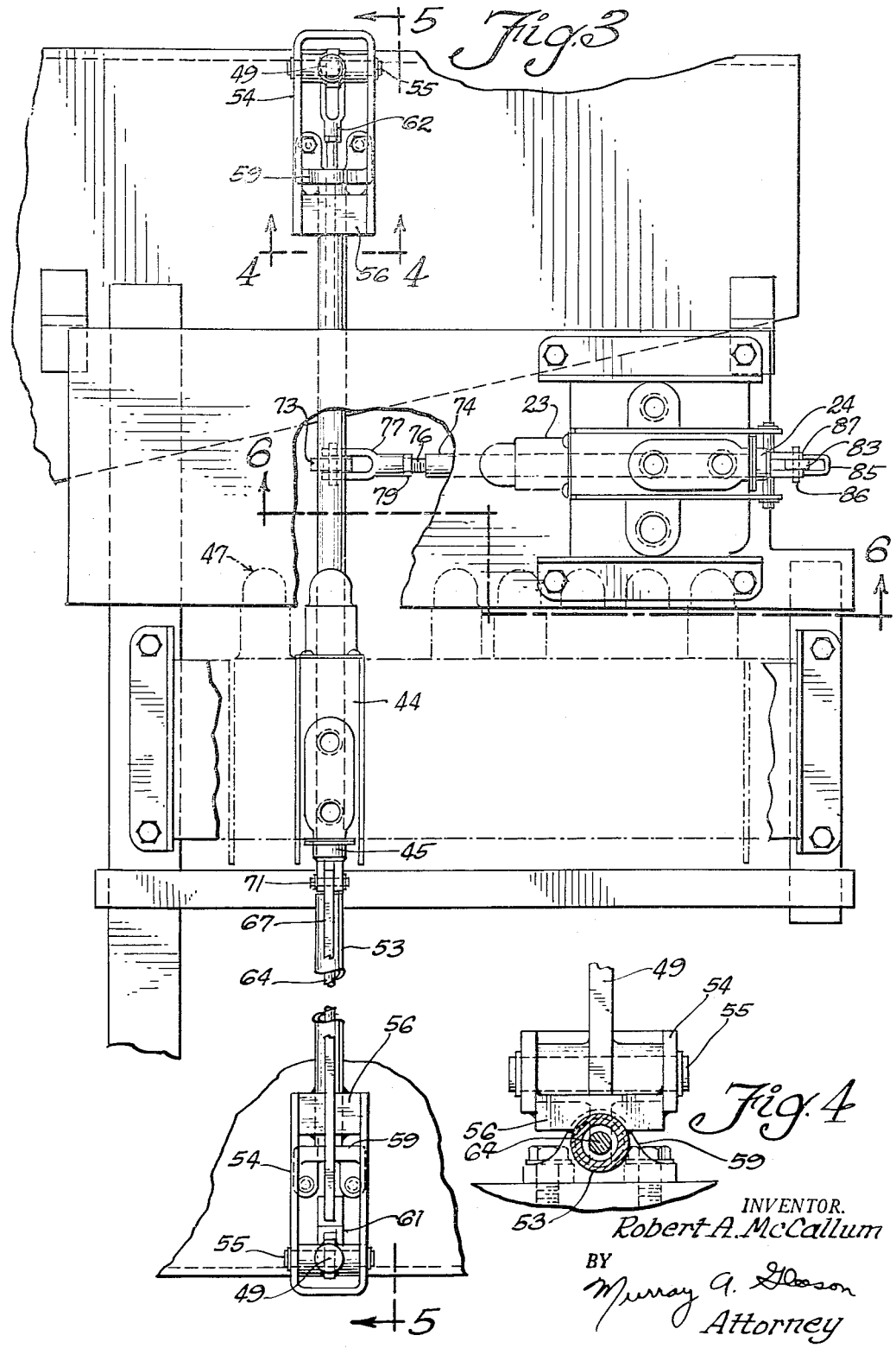

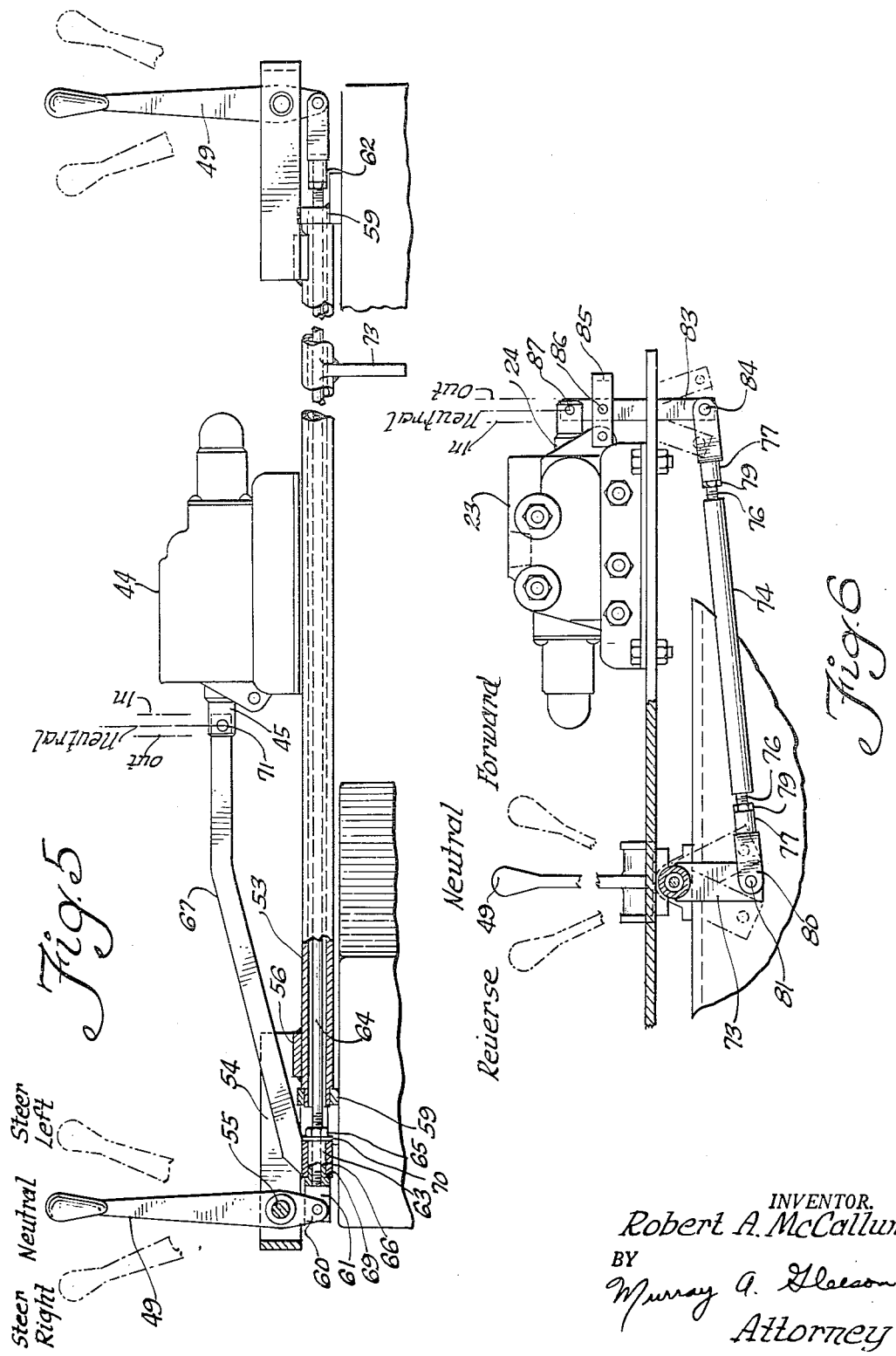

United States Patent Office 2,745,506
Patented May 15, 1956

2,745,506

LEVER CONTROL MECHANISM FOR COMBINED OPERATION OF VEHICLE TRAMMING AND STEERING VALVES

Robert A. McCallum, Clarendon Hills, Ill., assignor to Goodman Manufacturing Company, Chicago, Ill., a corporation of Illinois Application October 21, 1952, Serial No. 316,045

4 Claims. (Cl. 180—77)

This invention relates to improvements in controls for the steering and tramming of a vehicle and more particularly to such controls adapted to control the steering and tramming of a kerf cutting machine operable in confined spaces underground, such as mines.

A principal object of my invention is to provide a simple and novel form of control for a vehicle wherein steering and tramming may be effected by operation of a single control lever.

A further object of my invention is to provide a novel and improved control means for the steering and tramming of a vehicle such as a kerf cutting machine, operable from either side of the machine by the operation of one of a pair of spaced connected control levers.

A still further object of my invention is to provide a simple and efficient control for a hydraulically steered and trammed vehicle, wherein a single control lever at either side of the machine may be operated to effect both steering and tramming of the vehicle.

A still further object of my invention is to provide a novel and improved form of control for a vehicle using reversible hydraulic motor devices for tramming the vehicle and other hydraulic motor devices for steering the vehicle, with one valve for controlling operation of the tramming hydraulic motor devices and a second valve controlling operation of the steering hydraulic motor devices, together with a simple link and lever arrangement operable from a hand operated control lever at either side of the machine, for effecting steering and tramming in either direction at the will of the operator.

Still another object of my invention is to provide a novel and improved form of kerf cutting machine of the wheel mounted combination horizontal and shearing cutting type, utilizing hydraulic motor devices for tramming the vehicle in reverse directions and other hydraulic motor devices for steering the vehicle, with separate valves for controlling operation of the steering and tramming hydraulic motor devices and a control lever at each sides of the machine with a simple link and lever connection to the two valves, for steering the vehicle upon movement of the control lever in one direction and tramming the vehicle upon movement of the control lever in an opposite direction in any position of movement of the lever in the one direction.

These and other objects of my invention will appear from time to time as the following specification proceeds and with reference to the accompanying drawings, wherein:

Figure 3 is an enlarged fragmentary plan view showing the steering and tramming valves and the operating mechanism therefor;

Figure 4 is a fragmentary sectional view taken substantially along line 4—4 of Figure 3;

Figure 5 is a fragmentary transverse sectional view taken substantially along line 5—5 of Figure 3; and Figure 6 is a fragmentary sectional view taken substantially along line 6—6 of Figure 3.

Figure 1:
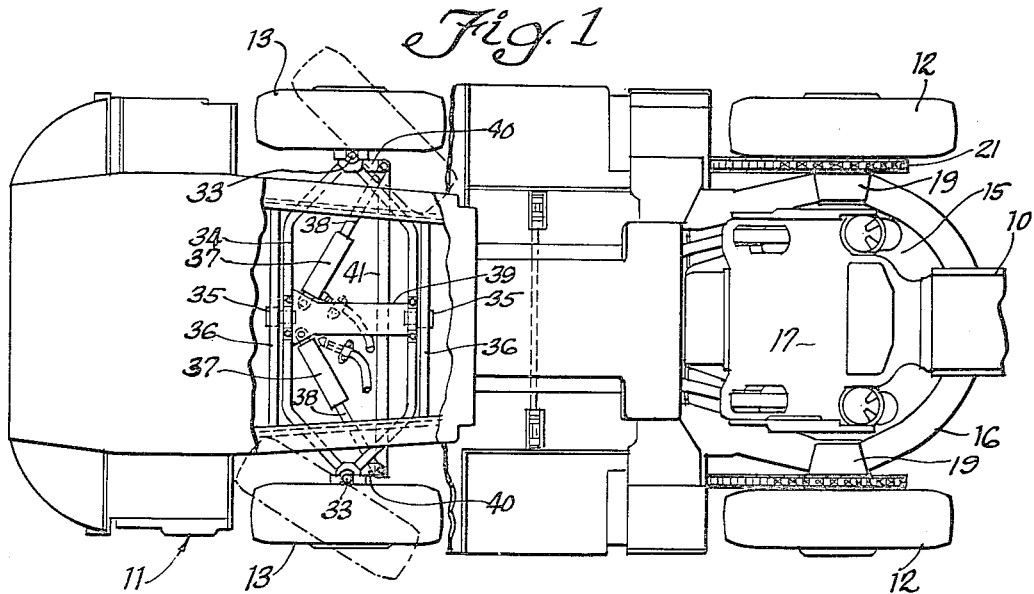
Figure 1 is a fragmentary plan view of a kerf cutting machine with parts broken away in order to illustrate one manner in which the steering and tramming control of my invention may be embodied.

In Figure 1 of the drawings, I have shown a portion of a kerf cutting machine 10 of the combination horizontal and shearing type.

The kerf cutting machine is shown as having a main frame 11 supported on front rubber-tire mounted traction wheels 12, 12 and rear rubber-tire mounted steering wheels 13, 13. The machine shown is of the same general construction as shown in a companion application, Serial No. 305,742, filed August 22, 1952 and entitled "Horizontal and Shearing Kerf Cutting Machine," and includes generally a turntable 15 mounted at the front of the main frame 11 of the machine. The turntable 15 may have a motor 17 trunnioned thereon from which extends a cutting element (not shown) mounted for movement about an axis extending longitudinally of the axis of the motor shaft, for positioning the usual cutter bar (not shown) to cut horizontal and shearing kerfs in the coal face, as is well known to those skilled in the art so is not herein shown or described in detail.

The front traction wheels 12, 12 are suitably mounted on axles (not shown) projecting laterally from bosses 19, 19 of the truck frame and reversely driven from fluid motors 20, 20 by means of individual chain and sprocket drives 21, 21.

Figure 2:
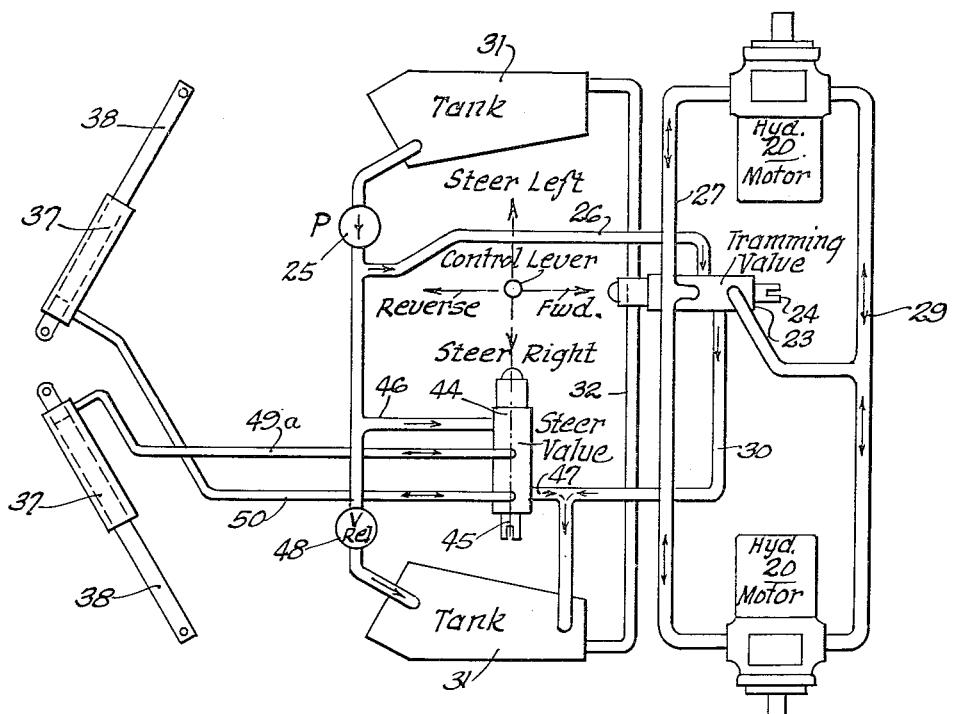
Figure 2 is a fluid diagram illustrating one arrangement of fluid conduits and valves which may be used to effect tramming and steering of the vehicle.

The fluid motors 20, 20 are shown in Figure 2, as being controlled by a valve 23, which may be a well known form of piston valve having a valve piston 24 movable within the valve body and extending therefrom. The valve 23 is connected with a pump 25 through a fluid pressure line 26. The valve 23 is shown as having fluid connection with one side of the tramming motors 20, 20 through a fluid pressure line 27, for supplying fluid under pressure thereto, to drive said tramming motors in one direction, in one extreme position of the valve. The valve 23 is likewise connected with the opposite sides of the tramming motors 20, 20 by a fluid pressure line 29 to supply fluid under pressure to said motors through said pressure line and drive said motors in a reverse direction in another extreme position of the valve.

It is, of course, understood that when pressure is supplied to the fluid motors 20, 20 through the pressure line 27 that fluid is returned to the tank through the line 29 and vice versa. The return from the valve 23 is through a return line 30 connected with one fluid storage tank of a pair of fluid storage tanks 31, 31.

The two fluid storage tanks 31, 31 are shown as being connected together by a fluid passageway member or conductor 32, which may be in the form of a cored passageway extending transversely along the front part of a main frame of the machine as in my companion application Serial No. 306,600, filed on Aug. 27, 1952 and entitled "Integral Main frame and Oil Storage Tank Construction."

The rear steering wheels 13, 13 are shown as being mounted on spindles 33, 33 carried at opposite ends of an axle structure 34. The axle structure 34 is in the form of a cradle pivoted intermediate its ends, for movement about an axis extending longitudinally of the machine on pivot pins 35, 35, shown as extending inwardly from transverse frame structures 36, 36 of the main frame of the machine.

The wheels 13, 13 are turned about the axis of the spindles 33, 33 for steering the vehicle by means of two single acting cylinders 37, 37 having piston rods 38, 38 extensible therefrom. The cylinders 37, 37 are shown as being pivoted at their head ends to a central brace 39 of the axle or cradle 34. The piston rods 38 are shown as being pivoted to steering arms 40, 40 for turning the wheels 13, 13 above the spindles 33, 33 for steering the vehicle. A tie rod 41 is provided to connect the steering arms 40, 40 together.

The admission and release of fluid under pressure to and from the head ends of the cylinders 37, 37 to turn the steering wheels 13, 13 in the desired direction is controlled by a single steering valve 44. The valve 44, like the valve 23, may be of a well known form of piston-type valve having a piston 45 rectilinearly movable within the valve body and extensible therefrom. Fluid under pressure is supplied to the valve 44 from the pump 25 through a pressure line 46 and is returned to the tank 31, 31 through a return line 47 connected with the return 30 leading from the valve 23. A relief valve 48 is provided to relieve pressure from the two valves when in a neutral position or upon overload of the system. A pressure line 49a is connected from the valve 44 to the head end of one cylinder 37, for supplying fluid under pressure thereto and releasing fluid therefrom. A pressure line 50 is connected from the valve 44 to the head end of the opposite cylinder 37, for supplying fluid under pressure thereto and releasing fluid therefrom. When the valve is in one position fluid may be supplied to the head end of the right hand cylinder 47 through the pressure line 49 and may be released from the left hand cylinder 37 through the line 50. When the valve 44 is in an opposite extreme position, fluid under pressure may be supplied to the head end of the cylinder 37 through the pressure line 50 and may be released from the head end of the right hand cylinder 37 through the line 49a. When the valve is in a neutral position, fluid will be held in the cylinders 37, 37, to maintain the steering wheels in the desired position.

Referring now in particular to Figures 3, 4, 5 and 6, and the mechanism for operating the valves 23, and 44 from either side of the machine, the valve 44 is shown as being one valve of a bank of valves 47 mounted on the truck 11 between the storage tanks 31, 31 and operated by either one of two hand operated control levers 49, located at the opposite sides of the machine. The valve 23 is shown as being separate from the bank of valves 47, 47 and as being disposed at right angles with respect to the valve 44 for convenience in operation of the two valves either simultaneously or independently of each other, by the operation of either of the control levers 49. The valve 23 may have fluid communication with the same manifold that supplies fluid under pressure to the bank of valves 47 and to the valve 44.

The control levers 49, 49 are shown as being mounted at opposite ends of a transversely extending pivotally movable sleeve 53 on yokes 54, 54, mounted at opposite ends of said sleeve and extending laterally therefrom. Each yoke 54 is shown as being of a generally U-shaped form in plan with the open end thereof facing the center of the machine and as having the lever 49 pivoted thereto on a pivot pin 55, mounted at its ends in the legs thereof. The yoke 54 is shown as having a transverse plate 56 secured to its legs, adjacent the open ends thereof, as by welding. The plate 56 is shown as extending across an end of the transverse sleeve 53 and as being welded thereto. The sleeve 53 is shown as being pivotally mounted at its ends on bearing supports 59, 59, extending upwardly from the main frame of the machine. Said sleeve may pivotally move about its longitudinal axis by the exertion of pressure on either control lever 49 in a direction longitudinally of the machine and along the axis of the pivot pin 55.

Each control lever 49 has a depending lever arm 60. A connector 61 is pivotally connected to the lever arm 60 of the control lever 49 at the left hand side of the machine. A connector 62 is pivotally connected to the lever arm 60 of the control lever 49 at the right hand side of the machine. The connector 61 has a forwardly projecting generally cylindrical or sleeve-like portion 63 having one end of a link 64 threaded therein and locked thereto, as by a lock nut 65. The opposite end of the link 64 is shown as being threaded and locked to the connector 62. The link 64 is shown as being in a form of a threaded rod extending through the sleeve 53 coaxial with the pivotal axis thereof and as connecting the control levers 49, 49 to operate together. The connector 61 is shown as having a sleeve portion 66 of a link 67 mounted thereon on the cylindrical portion 63 thereof, for movement therewith and for pivotal movement with respect thereto. The sleeve portion 66 of the link 67 abuts a shouldered portion 69 of the connector 61 at one of its ends, and abuts a washer 70 at its opposite end and is held in engagement therewith by the nut 65. The link 67 is shown as extending transversely of the machine frame in an upwardly inclined direction from the sleeve portion 66 thereof toward the piston 45 of the valve 44, and as being pivotally connected thereto by a pivot pin 71. Thus, upon pivotal movement of either of the control levers 49 about the axis of the respective pivot pin 55, the link 67 will be rectilinearly moved with the link 64 to position the piston 45 of the valve 44 in the required position to turn the vehicle to the right when the lever 49 is in one extreme position and to turn the vehicle to the left when the control lever 49 is in an opposite extreme position. When the control lever 49 is in the upright or neutral position shown in Figure 5, the valve 44 will likewise be in a neutral position and fluid under pressure may be held in the two cylinders 37, 37.

It should here be noted that since the control levers 49, 49 are connected together by a single link, that when the control lever 49 on the left hand side of the machine is pivoted inwardly toward the center of the machine, the control lever 49 on the right hand side of the machine will pivotally move outwardly from the center of the machine. While a reverse linkage may be provided to move the control levers 49, 49 in reverse directions, in the form of my invention herein shown such a reverse linkage is not used in order that the feel of steering may be the same from either side of the machine. That is, when on the right hand side of the machine and it is desired to steer the machine to turn to the right, the control lever 49 on that side of the machine may be moved outwardly, or to the operators right when facing the forward end of the machine. When on the opposite side of the machine, and it is desired to turn to the right, the hand lever 49 may be moved inwardly or to the operators right, when standing on that side of the machine and facing the forward end of the machine. Thus, the two control levers 49 may be moved either in right hand or left hand directions from either side of the machine to turn the steering wheels to steer the vehicle to the right or left.

It should be understood from the foregoing that since the sleeve 66 is coaxial with the axis of turning movement of the sleeve 53 that the control levers 49, 49 may be pivoted either inwardly or outwardly to operate the link 67 and the valve piston 45 in any position of pivotal movement of the sleeve 53 and yokes 54, 54 with respect to the main frame of the machine.

The tramming motors 20, 20 are operated to start or stop the vehicle and to drive the vehicle in either a forward or reverse direction by pivotal movement of the sleeve 53 either toward the forward or rear end of the machine. The sleeve 53 is shown as having a crank or rocking arm 73 depending therefrom intermediate its ends, to which is connected a link 74, for operating the valve 23.

The link 74 is shown as being an adjustable link and as having threaded ends 76, 76 and having connectors 77, 77 threaded thereon and locked in position by lock nuts 79, 79. One connector 77 is shown as having a bifurcated portion extending along each side of the rocking arm 73 and pivotally connected thereto by a pivot pin 81. The furcations of the other connector 77 are shown as extending along opposite sides of a lever arm 83 for operating the valve 23, and as being pivotally connected thereto, as by a pivot pin 84. A bracket 85, shown as being of a generally U-shaped formation and extending forwardly from the block of the valve 23 is provided to form a mounting for the lever arm 83, on a pivot pin 86. The upper end of the lever arm 83 is pivotally connected to the piston 24 of the valve 23 by a pivot pin 87.

The piston 24 may be moved either inwardly or outwardly into position to supply fluid under pressure to the tramming motors 20, 20 to propel the machine in either a forward or a reverse direction by operation of either of the control levers 49, 49 upon pivotal movement of the sleeve 53 about its axis of connection to the machine. As herein shown, when either control lever 49 is moved toward the forward end of the machine, the tramming motors 20, 20 will be driven in a direction to tram the machine forwardly, and when either control lever 49 is moved toward the rear end of the machine, the direction of travel of the machine will be reversed. It may further be seen that either control lever 49 may be operated to reverse travel of the machine in any operative position of said control lever to operate the valve 44 to steer the machine, and that in a contrary manner, the valve 44 may be operated to steer the machine in any operative position of said control lever 49, to effect tramming of the machine in either a forward or reverse direction.

It may be seen from the foregoing that a simple and novel form of steering and tramming control operable from either side of a machine has been provided, which is particularly adapted to control the tramming and steering of a kerf cutting machine and operates the steering and tramming valves either simultaneously or independently of each other, to turn the steering wheels when the machine is stationary or is moving in either a forward or reverse direction and to tram the vehicle in either a forward or reverse direction during the steering operation, and that the steering and tramming is controlled all by the operation of either one of two control levers, one of which is at either side of the machine.

It will be understood that modifications and variations may be effected without departing from the scope of the novel concepts of the present invention.

I claim as my invention.

1. In a control mechanism for a vehicle having at least two valves controlling tramming and steering thereof, a sleeve extending transversely of the vehicle and mounted thereon for pivotal movement with respect thereto about its longitudinal axis, a support member carried by said sleeve at each end thereof, a control lever pivotally mounted on each support member for pivotal movement about an axis extending transversely of the longitudinal axis of said sleeve, a link extending through said sleeve and beyond opposite ends thereof and connected at its ends with said control levers and moved along the axis of said sleeve upon operation of either of said control levers, a second link pivotally mounted on said first link and connected with a first valve, means restraining movement of said second link along said first link to effect operation of said second link and said first valve upon operation of either of said control levers to move said first link along the axis of said sleeve, and a third link operatively connected with said sleeve and with another of said valves for operating the same upon pivotal movement of said sleeve about its longitudinal axis effected by operation of either of said control levers in the same direction with respect to said vehicle.

2. In a control mechanism for a vehicle having at least two valves controlling certain operations thereof, a sleeve extending transversely of the vehicle and mounted thereon for pivotal movement with respect thereto about the longitudinal axis of said sleeve, a support member carried at each end of said sleeve, a control lever pivotally mounted on each support member for movement about an axis extending transversely of the longitudinal axis of said sleeve, a link extending through said sleeve and connected at its ends with said control levers and moved along said sleeve upon operation of either of said control levers, a second link connected with a first valve, said second link being pivotally mounted on said first link to accommodate pivotal movement of said sleeve and support members, means restraining movement of said second link along said first link to effect operation of said valve upon rectilinear movement of said first link, a rocking arm on said sleeve, a third link connected with said rocking arm and operated thereby upon rocking movement of said sleeve, and a pivoted lever connecting said third link with a second valve for operating said second valve upon rocking movement of said sleeve and rocking arm, effected by operation of either of said control levers in the same direction.

3. In a control mechanism for a vehicle having at least two piston valves having pistons therein and arranged at right angles with respect to each other, two spaced control levers located at opposite sides of the vehicle, each being operable to simultaneously or independently operate said valves from either side of the vehicle upon movement of said control levers in the same direction with respect to the vehicle, a sleeve pivotally mounted on the vehicle and extending transversely thereof having a support member at each end thereof, pivot pins pivotally mounting said control levers on said support members for movement about axes disposed transversely of the pivotal axis of said sleeve, a link within said sleeve and pivotally connected at its ends with said control levers and rectilinearly moved along said sleeve upon operation of either of said control levers, a second link connected at one end with the piston of one of said valves for operating the same and pivotally mounted on said first link at its opposite end, to accommodate said sleeve to move about its axis of pivotal connection to the vehicle, said second link being rectilinearly moved upon rectilinear movement of said first link upon operation of either of said control levers about their axes of connection to said support members, a rocking arm on said sleeve and a third link connected from said rocking arm to the piston of the other of said valves for operating the same upon rocking movement of said sleeve effected by operation of either of said control levers in the direction of the pivotal axes thereof.

4. In a control mechanism for a vehicle having at least two valves arranged at right angles with respect to each other for controlling steering and tramming thereof, means operable from either side of the vehicle for independently and simultaneously operating said valves comprising a sleeve extending transversely of the vehicle and mounted thereon for pivotal movement with respect thereto about an axis extending longitudinally of said sleeve, support yokes at each end of said sleeve and mounted thereon, a control lever pivotally connected to each of said support yokes for pivotal movement with respect thereto about an axis extending transversely of the pivotal axis of said sleeve, each of said control levers having a depending lever arm, a first link extending through said sleeve and pivotally connected to said lever arms at its ends, a second link having operative connection with a first valve and pivotally mounted on said first link to accommodate pivotal movement of said sleeve with respect to said first link and also being restrained for movement along the axis of said first link, for operating said first valve upon rectilinear movement of said first link effected by pivotal movement of either of said control levers, a rocking arm extending from said sleeve, and a third link connecting said rocking arm with a second valve for operating the same effected by operation of either of said control levers in the same direction in the direction of the pivotal axis thereof.

References Cited in the file of this patent

UNITED STATES PATENTS

| | | |
|---|---|---|
| 1,611,236 | Rodgers | Dec. 21, 1926 |
| 1,925,893 | Bacon | Sept. 5, 1933 |
| 1,928,915 | Stout | Oct. 3, 1933 |
| 2,207,797 | Guier | July 16, 1940 |
| 2,384,447 | Baldwin | Sept. 11, 1945 |
| 2,393,324 | Joy | Jan. 22, 1946 |

FOREIGN PATENTS

| | | |
|---|---|---|
| 21,108 | Great Britain | 1907 |
| 611 | Great Britain | 1903 |